United States Patent [19]
Bhagalia et al.

[11] Patent Number: 6,052,365
[45] Date of Patent: *Apr. 18, 2000

[54] MULTI-CHANNEL DIGITAL DATA TRANSMISSION IN A WIRELESS TELECOMMUNICATIONS SYSTEM

[75] Inventors: Shashikant Bhagalia, London; Richard M. Lamkin, East Mosely, both of United Kingdom

[73] Assignee: DSC Communications Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/656,575

[22] Filed: May 31, 1996

[30] Foreign Application Priority Data

Jun. 2, 1995 [GB] United Kingdom ..................... 9510870
Mar. 29, 1996 [GB] United Kingdom ..................... 9606601

[51] Int. Cl.[7] ......................................................... H04J 3/00
[52] U.S. Cl. ........................... 370/336; 370/338; 370/446
[58] Field of Search ..................................... 370/465, 466, 370/467, 468, 469, 464, 473, 474, 498, 522, 536, 542, 912, 913, 328, 329, 336, 338, 337, 345, 348, 349, 277, 280; 379/56, 58, 59, 63; 455/31.1, 33.1, 49.1, 53.1, 422, 454, 507, 515, 517, 552, 556, 557

[56] References Cited

U.S. PATENT DOCUMENTS

| | | | |
|---|---|---|---|
| 5,297,190 | 3/1994 | Ito | 379/58 |
| 5,307,349 | 4/1994 | Shloss et al. | 370/442 |
| 5,440,613 | 8/1995 | Fuentes | 379/60 |
| 5,450,471 | 9/1995 | Hanawa et al. | 455/552 |
| 5,463,623 | 10/1995 | Grimes et al. | 370/466 |
| 5,479,479 | 12/1995 | Braitberg et al. | 455/404 |
| 5,619,528 | 4/1997 | Rebec et al. | 375/219 |
| 5,629,939 | 5/1997 | Ohde et al. | 370/466 |
| 5,638,371 | 6/1997 | Raychaudhuri et al. | 370/347 |
| 5,640,386 | 6/1997 | Wiedeman | 370/320 |

*Primary Examiner*—Chi H. Pham
*Assistant Examiner*—Kwang B. Yao
*Attorney, Agent, or Firm*—Baker & Botts, L.L.P.

[57] ABSTRACT

A wireless telecommunications system includes a central station communicates with a plurality of subscriber stations served by the central station. The central station is connectable to a telecommunications network under a multiplexed multi-channel digital data telecommunications protocol having a plural number of data channels. Each subscriber station provides a line connection for carrying a predetermined number of digital data channels, where the plural number is greater than the predetermined number. The central station is connectable to each subscriber station via a wireless link under a wireless link protocol having the predetermined number of data channels. The central station includes a central protocol interface for converting between the multi-channel telecommunications protocol and the wireless link protocol for each wireless link. The subscriber station includes a subscriber protocol interface for converting between the wireless link protocol and the multiplexed multi-channel digital data telecommunications protocol with the predetermined number of digital data channels active. By converting an incoming multi-channel digital data protocol to a wireless link protocol, and then reconverting the wireless link protocol to a multi-channel digital data protocol at the other end, it is possible to provide for selective communication in accordance with the multi-channel digital data protocol, despite the limited bandwidth available.

49 Claims, 15 Drawing Sheets

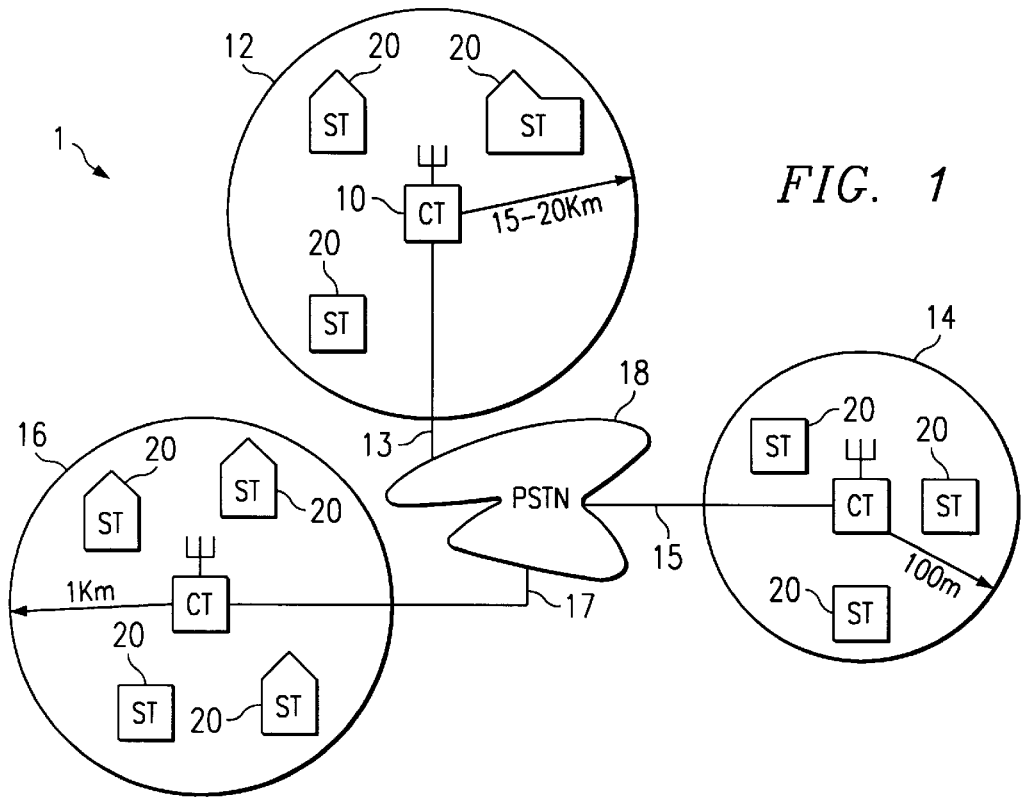
FIG. 1
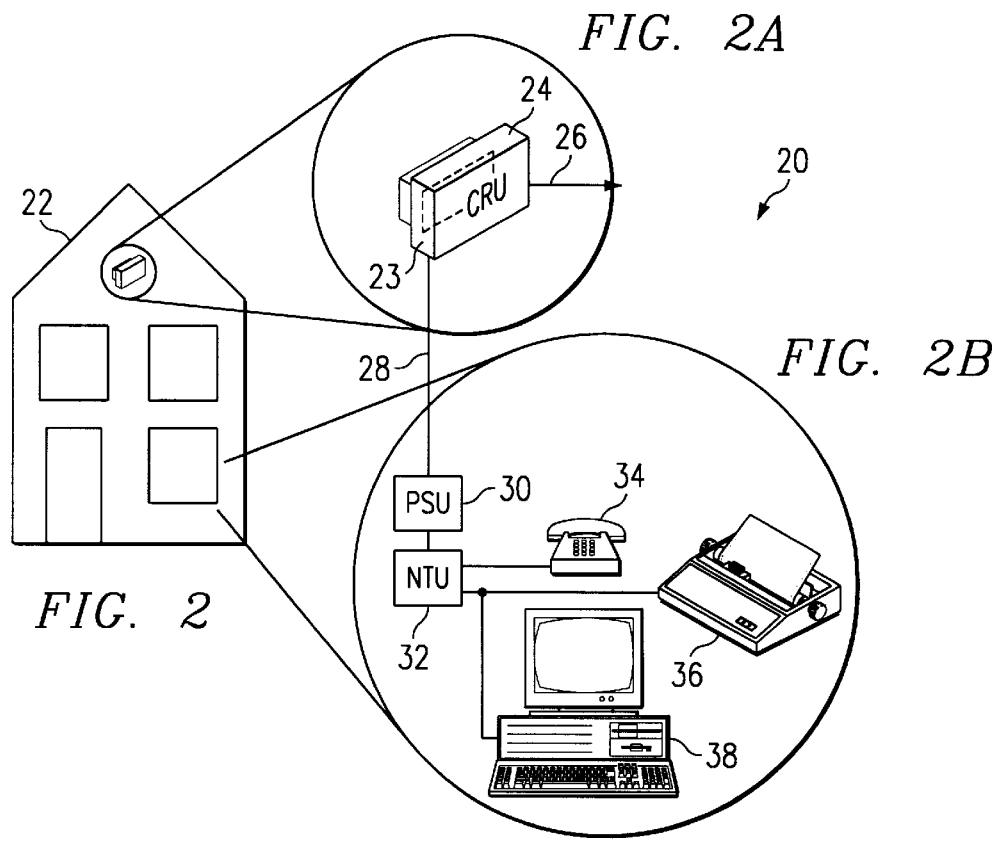
FIG. 2
FIG. 2A
FIG. 2B

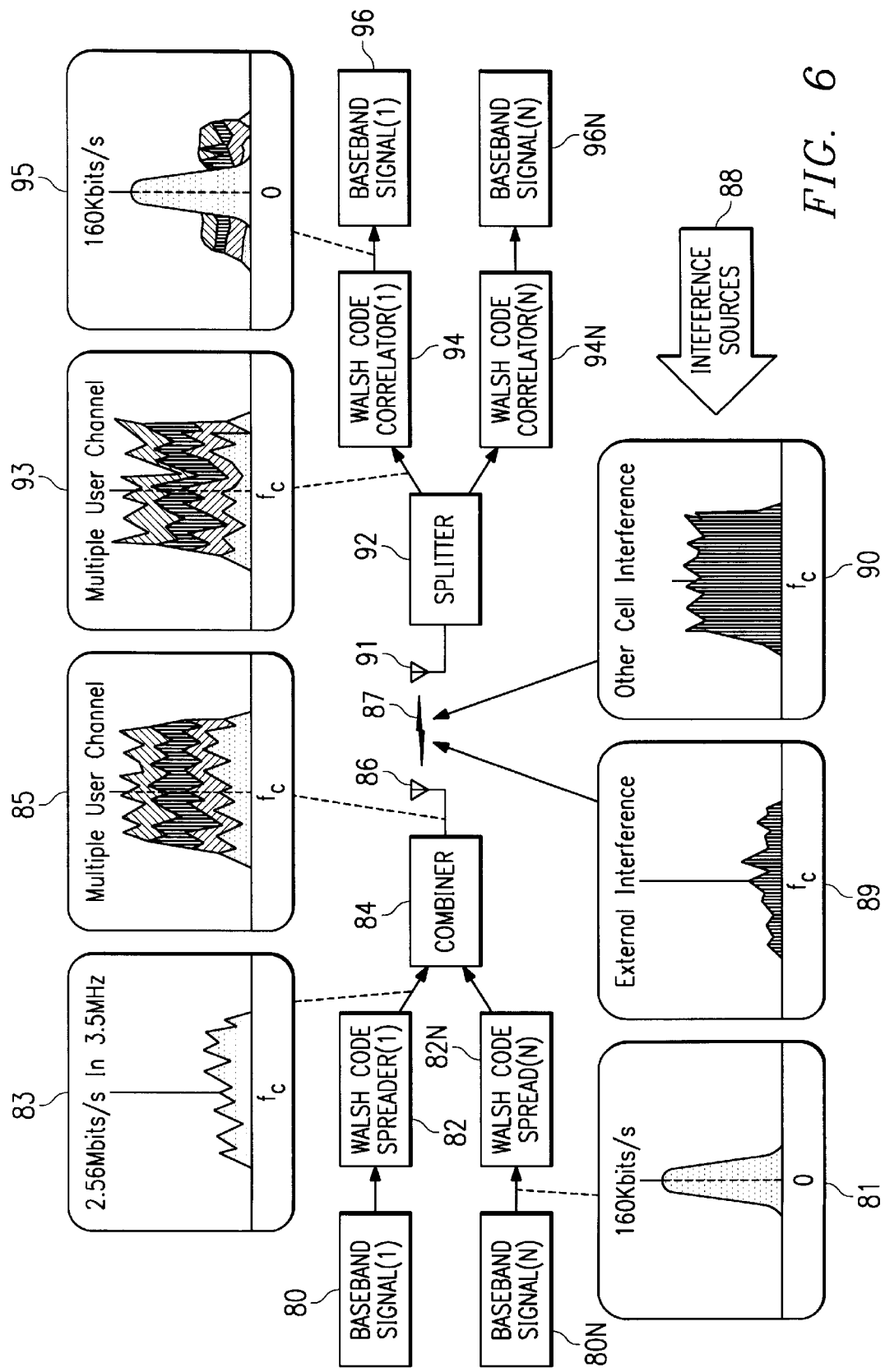

| TIMESLOT | |
|---|---|
| 0 | FRAMING INFORMATION |
| 1 | CHANNEL 1 |
| 2 | CHANNEL 2 |
| 3 | CHANNEL 3 |
| 4 | CHANNEL 4 |
| 5 | CHANNEL 5 |
| 6 | CHANNEL 6 |
| 7 | CHANNEL 7 |
| 8 | CHANNEL 8 |
| 9 | CHANNEL 9 |
| 10 | CHANNEL 10 |
| 11 | CHANNEL 11 |
| 12 | CHANNEL 12 |
| 13 | CHANNEL 13 |
| 14 | CHANNEL 14 |
| 15 | CHANNEL 15 |
| 16 | CAS INFORMATION |
| 17 | CHANNEL 16 |
| 18 | CHANNEL 17 |
| 19 | CHANNEL 18 |
| 20 | CHANNEL 19 |
| 21 | CHANNEL 20 |
| 22 | CHANNEL 21 |
| 23 | CHANNEL 22 |
| 24 | CHANNEL 23 |
| 25 | CHANNEL 24 |
| 26 | CHANNEL 25 |
| 27 | CHANNEL 26 |
| 28 | CHANNEL 27 |
| 29 | CHANNEL 28 |
| 30 | CHANNEL 29 |
| 31 | CHANNEL 30 |

*FIG. 14D*

MULTI-CHANNEL DIGITAL DATA TRANSMISSION IN A WIRELESS TELECOMMUNICATIONS SYSTEM

TECHNICAL FIELD OF THE INVENTION

The present invention relates in general to telecommunications systems and more particularly to multi-channel digital data transmission in a wireless telecommunications system.

BACKGROUND OF THE INVENTION

A wireless telecommunications system has been proposed with a central terminal, or station, at a central location in wireless communication with a plurality of subscriber terminals, or stations, at subscriber locations to implement a wireless telephony system. The system is intended to be used with fixed subscriber locations rather than the more familiar mobile cellular telephone systems.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

SUMMARY OF THE INVENTION

Due to bandwidth constraints, only a limited number of channels can be broadcast between a central terminal and a subscriber terminal. This means that there is insufficient bandwidth directly to provide communications in accordance with a multiplexed multi-channel digital data transmission standard, such as the E1 telecommunications standard. An object of the invention is to mitigate this problem.

In accordance with one aspect of the invention, there is provided a communications protocol converter for a central station of a wireless telecommunications system in which the central station communicates with a plurality of subscriber stations served by the central station, the central station is connectable to a telecommunications network under a multiplexed multi-channel digital data telecommunications protocol having a plural number of digital data channels, each subscriber station provides a line connection for carrying a predetermined number of digital data channels, where the plural number is greater than the predetermined number, and the central station is connectable to each subscriber station via a wireless link under a wireless link protocol having the predetermined number of data channels, wherein the communications protocol converter comprises a central protocol interface for converting between the multiplexed multi-channel digital data telecommunications protocol and the wireless link protocol for each wireless link.

In accordance with another aspect of the invention, there is provided a communications protocol converter for a subscriber station of a wireless telecommunications system in which a central station communicates with a plurality of the subscriber stations served by the central station, the central station is connectable to a telecommunications network under a multiplexed multi-channel digital data telecommunications protocol having a plural number of data channels, each subscriber station provides a line connection for carrying a predetermined number of digital data channels, where the plural number is greater than the predetermined number, and the central station is connectable to each subscriber station via a wireless link under a wireless link protocol having the predetermined number of data channels, wherein the subscriber station comprises a subscriber protocol interface for converting between the wireless link protocol and the multiplexed multi-channel digital data telecommunications protocol with the predetermined number of digital data channels active.

By converting an incoming multiplexed multi-channel digital data protocol to a wireless link protocol, and then reconverting the wireless link protocol to a multiplexed multi-channel digital data protocol at the other end, it is possible to provide for selective communication in accordance with the multiplexed multi-channel digital data protocol, despite the limited bandwidth available.

Preferably, the multiplexed multi-channel digital data protocol comprises multiple frames with individual channels being allocated to respective timeslots within each frame. This enables a flexible adaptation of the system to take account of changes in configuration, equipment failures, etc., particularly where allocation of an externally received channel timeslot to a wireless transmission timeslot is variable.

Preferably, timeslot allocation is controlled at the central station, for a subscriber station by passing control data via an additional wireless control channel.

Preferably, at the central station and between the multiplexed multi-channel digital data protocol and the wireless link protocol, timeslots are allocated to an intermediate protocol. Preferably, the allocation of timeslots is dynamically variable.

In one example, the plural number is 30 and the predetermined number is 2. In this example, each data channel has a 64 kbit/sec bandwidth and each overhead control channel has a 16 kbit/sec bandwidth. In the particular example the multiplexed multi-channel digital data protocol is an E1 standard protocol (e.g., a 2 Mb/sec E1 protocol) without the telephone signalling information (i.e. with the CAS timeslot 16 not being used or at idle).

Preferably, the wireless link protocol comprises a signalling channel for carrying serial link management data and the wireless link protocol carries serial data on the data channels. In this case the signalling channel preferably has a 16 kbit/sec bandwidth.

Preferably the communications protocol converter comprises a modem. In one embodiment of the invention, the communications protocol converter at the central station comprises a modem card and a tributary unit, and the communications protocol converter at the subscriber station comprises a modem card.

The invention also provides a central station of a wireless telecommunications system in which the central station communicates with a plurality of subscriber stations served by the central station, the central station is connectable to a telecommunications network under a multiplexed multi-channel digital data telecommunications protocol having a plural number of digital data channels, each subscriber station provides a line connection for carrying a predetermined number of digital data channels, where the plural number is greater than the predetermined number, and the central station is connectable to each subscriber station via a wireless link under a wireless link protocol having the predetermined number of data channels, wherein the central station comprises a communications protocol converter for such a central station as defined above.

The invention also provides a subscriber station of a wireless telecommunications system in which a central station communicates with a plurality of the subscriber stations served by the central station, the central station is connectable to a telecommunications network under a multiplexed multi-channel digital data telecommunications protocol having a plural number of data channels, each subscriber station provides a line connection for carrying a predetermined number of digital data channels, where the plural number is greater than the predetermined number, and the central station is connectable to each subscriber station via a wireless link under a wireless link protocol having the predetermined number of data channels, wherein the subscriber station comprises a communications protocol converter for such a subscriber station as defined above.

The invention further provides a wireless telecommunications system in which a central station communicates with a plurality of subscriber stations served by the central station, the central station is connectable to a telecommunications network under a multiplexed multi-channel digital data telecommunications protocol having a plural number of data channels, each subscriber station provides a line connection for carrying a predetermined number of digital data channels, where the plural number is greater than the predetermined number, and the central station is connectable to each subscriber station via a wireless link under a wireless link protocol having the predetermined number of data channels, wherein the wireless telecommunications system comprises a central station and a plurality of subscriber stations as defined above.

In accordance with a further aspect of the invention, there is provided a method of transmitting information under a multiplexed multi-channel digital data telecommunications protocol having a plural number of data channels via a wireless telecommunications system where a central station for receiving the multiplexed multi-channel digital data telecommunications protocol provides wireless communication with a plurality of subscriber stations, each subscriber station providing a line connection for carrying a predetermined number of digital data channels, and the plural number being greater than the predetermined number, via wireless links under a wireless link protocol having the predetermined number of data channels, wherein the method comprises, at the central station converting between the multiplexed multi-channel digital data telecommunications protocol and the wireless link protocol for each wireless link, and at each subscriber station converting between the wireless link protocol and the multiplexed multi-channel digital data telecommunications protocol with the predetermined number of digital data channels active.

BRIEF DESCRIPTION OF THE DRAWINGS

Embodiments of the invention will be described hereinafter, by way of example only, with reference to the accompanying drawings in which like reference signs are used for like features and in which:

FIG. 1 is a schematic overview of an example of a wireless telecommunications system;

FIG. 2 is a schematic representation of a customer premises;

FIG. 2A and 2B are schematic illustrations of an example of a subscriber terminal of the telecommunications system of FIG. 1;

FIG. 6 is a schematic diagram illustrating aspects of a code division multiplex system for the telecommunications system of FIG. 1;

DETAILED DESCRIPTION OF THE INVENTION

Figure 3:
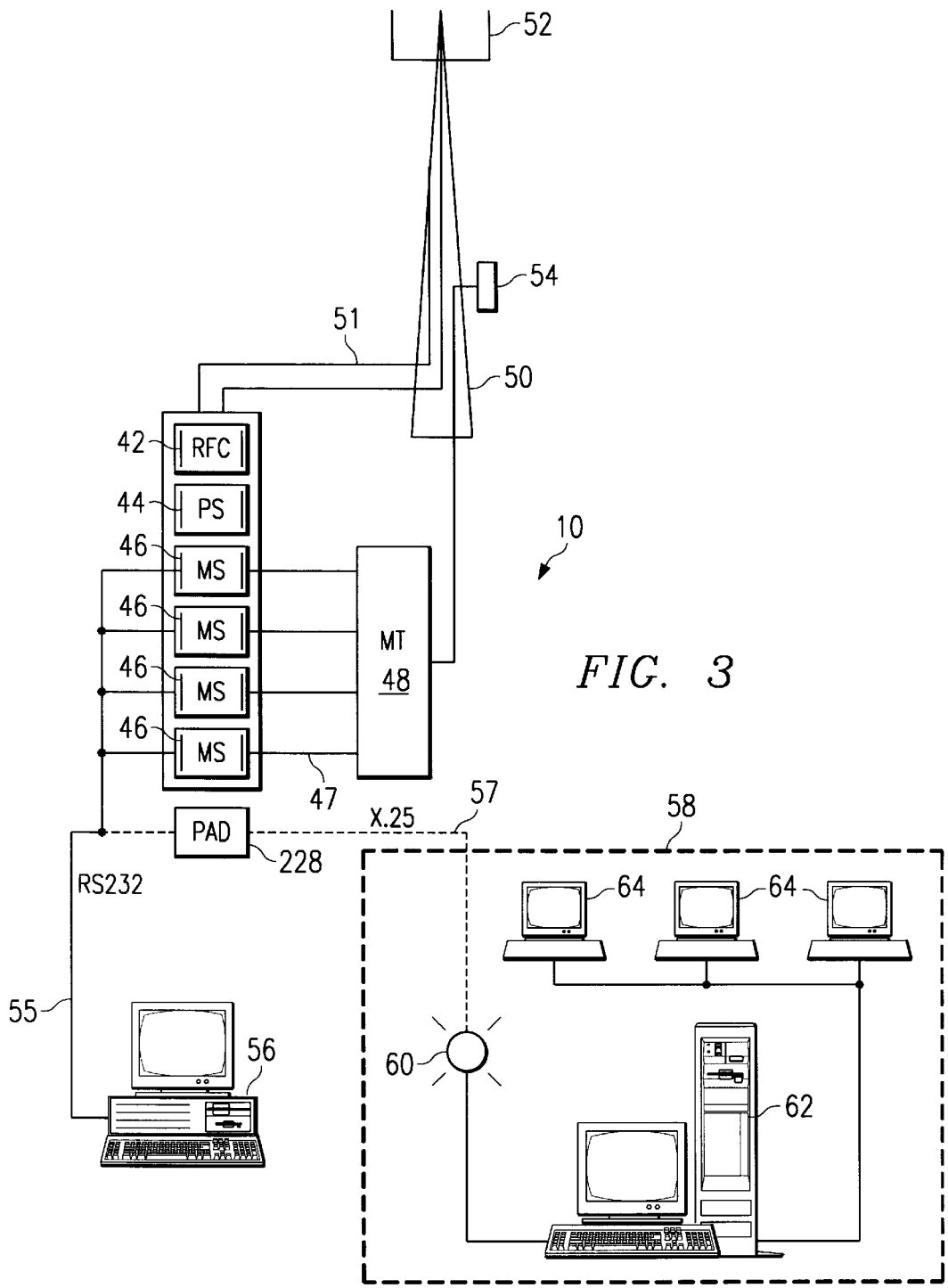
FIG. 3 is a schematic illustration of an example of a central terminal of the telecommunications system of FIG. 1.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc., and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

FIGS. 2A and 2B illustrate an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four ways so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
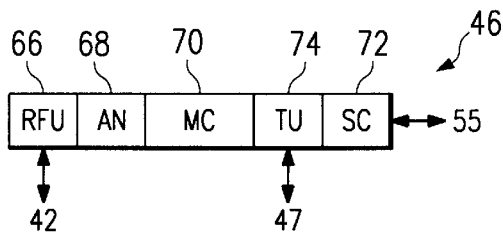
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x 16 spreading with CDMA codes on the transmit signals, and synchronisation recovery, de-spreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems).

Figure 4:
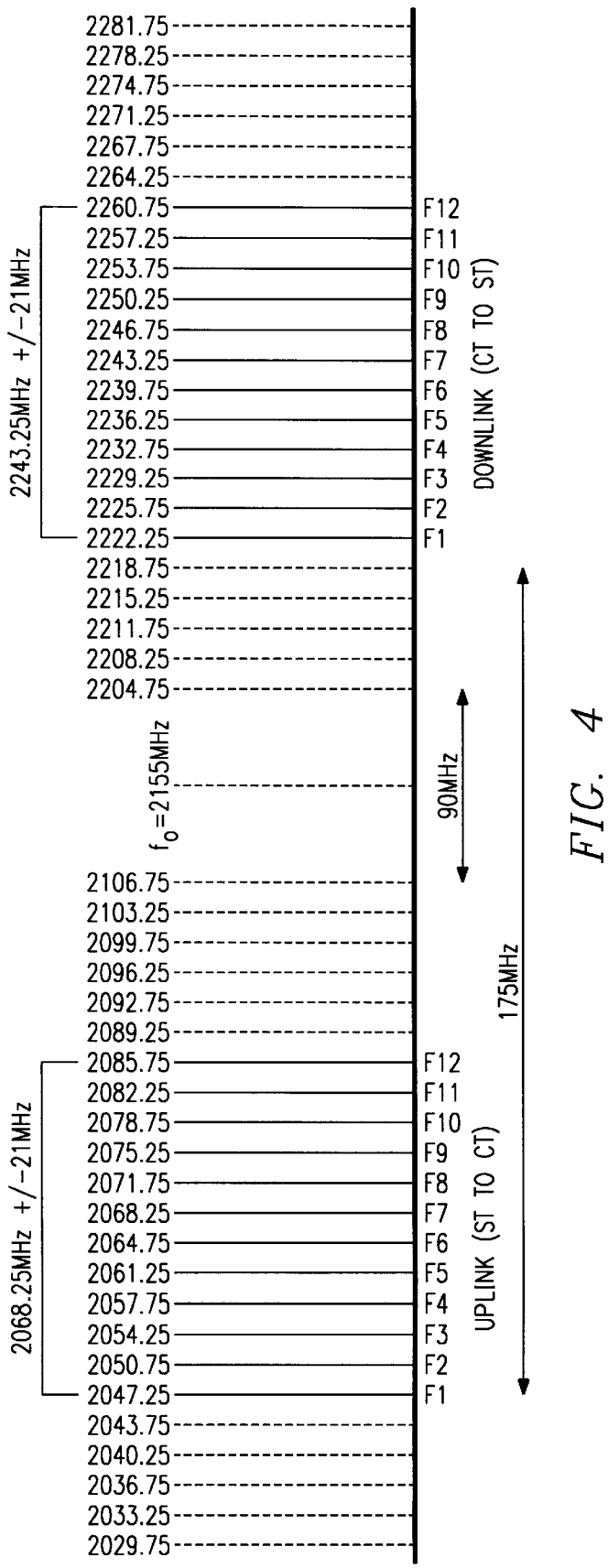
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
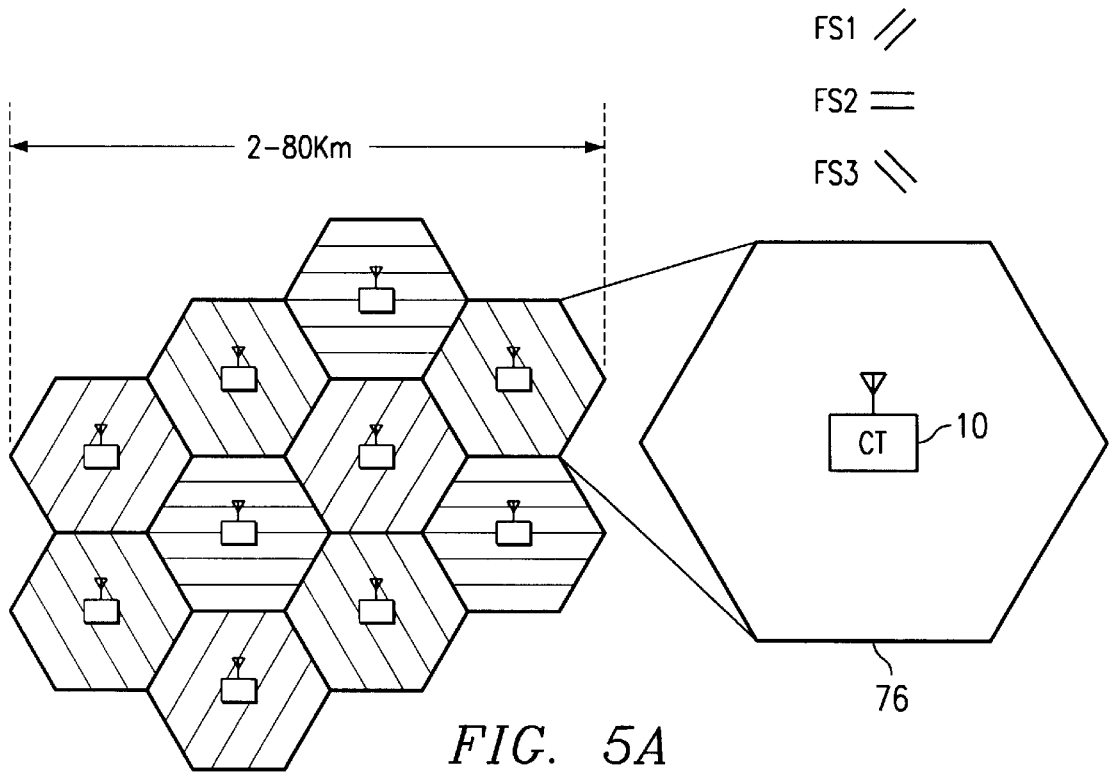
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
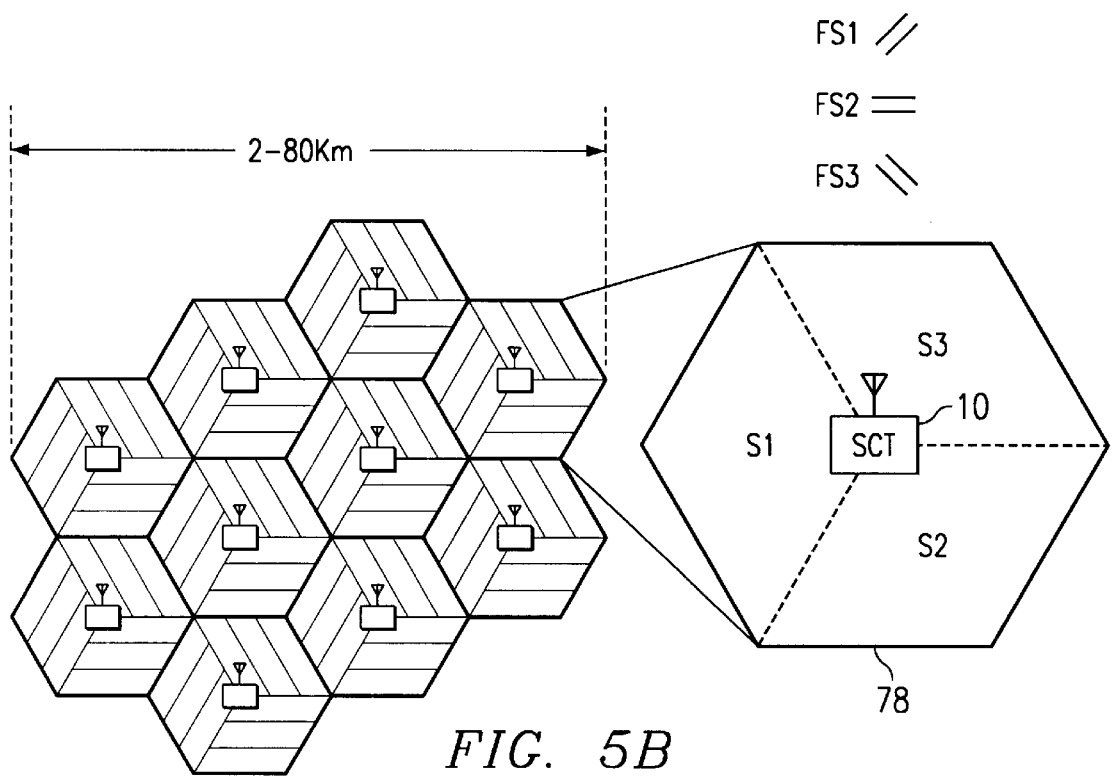

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12) . However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80–80 N into a 160 ksymbols/sec baseband signal where each symbol represents 2 data bits (see, for example the signal represented at 81). This signal is then spread by a factor of 16 using a respective Walsh pseudo random noise (PN) code spreading function 82–82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same pseudo random noise (PN) code that was used for the encoding for each subscriber link to extract a signal (e.g., as represented at 95) for the respective received baseband signal 96–96N. It will be noted that the received signal will include some residual noise. However, unwanted noise can be removed using a low pass filter and signal processing.

The key to CDMA is the application of orthogonal codes that allow the multiple user signals to be transmitted and received on the same frequency at the same time. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

Figure 7:
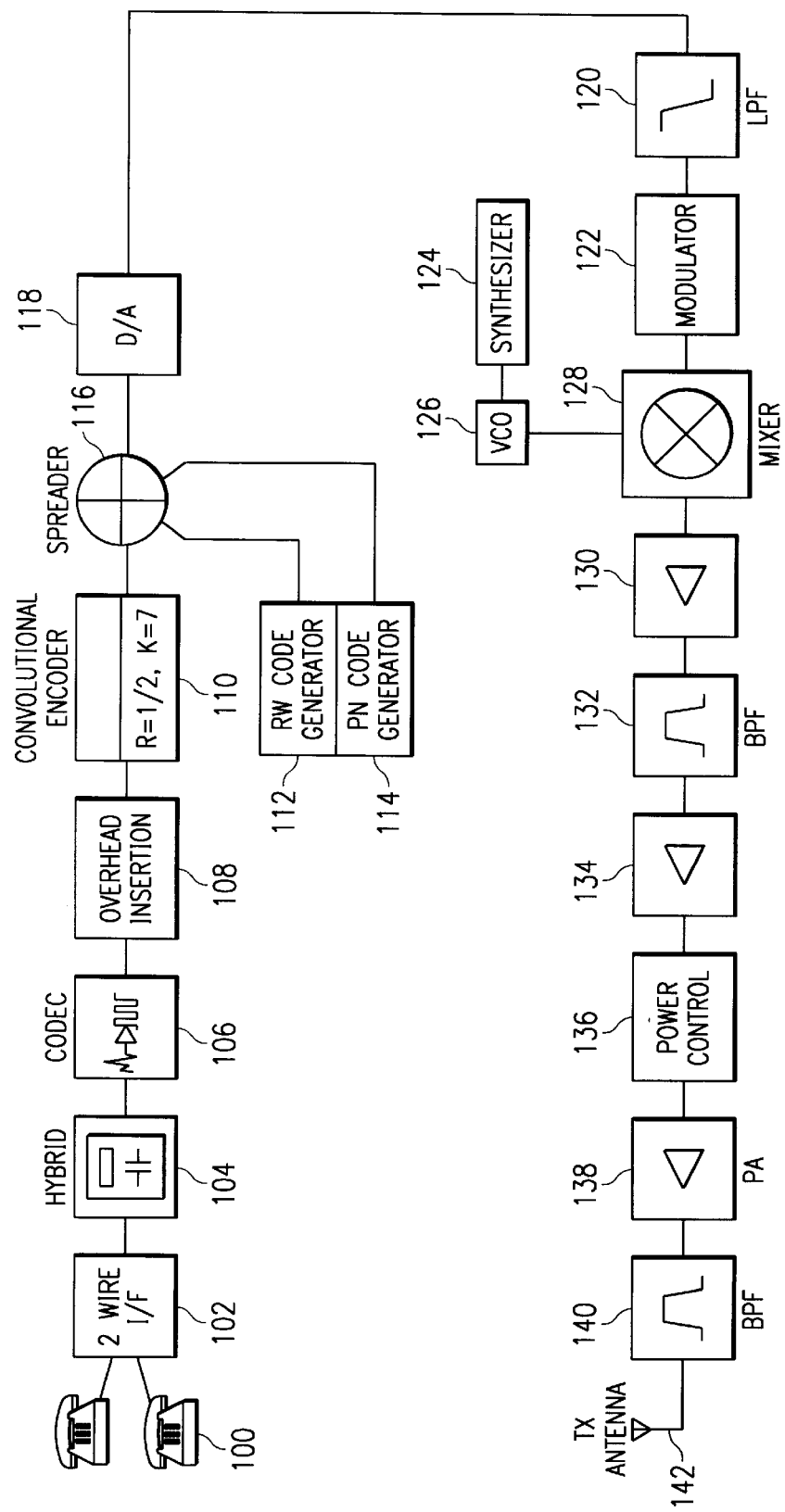
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Rademacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
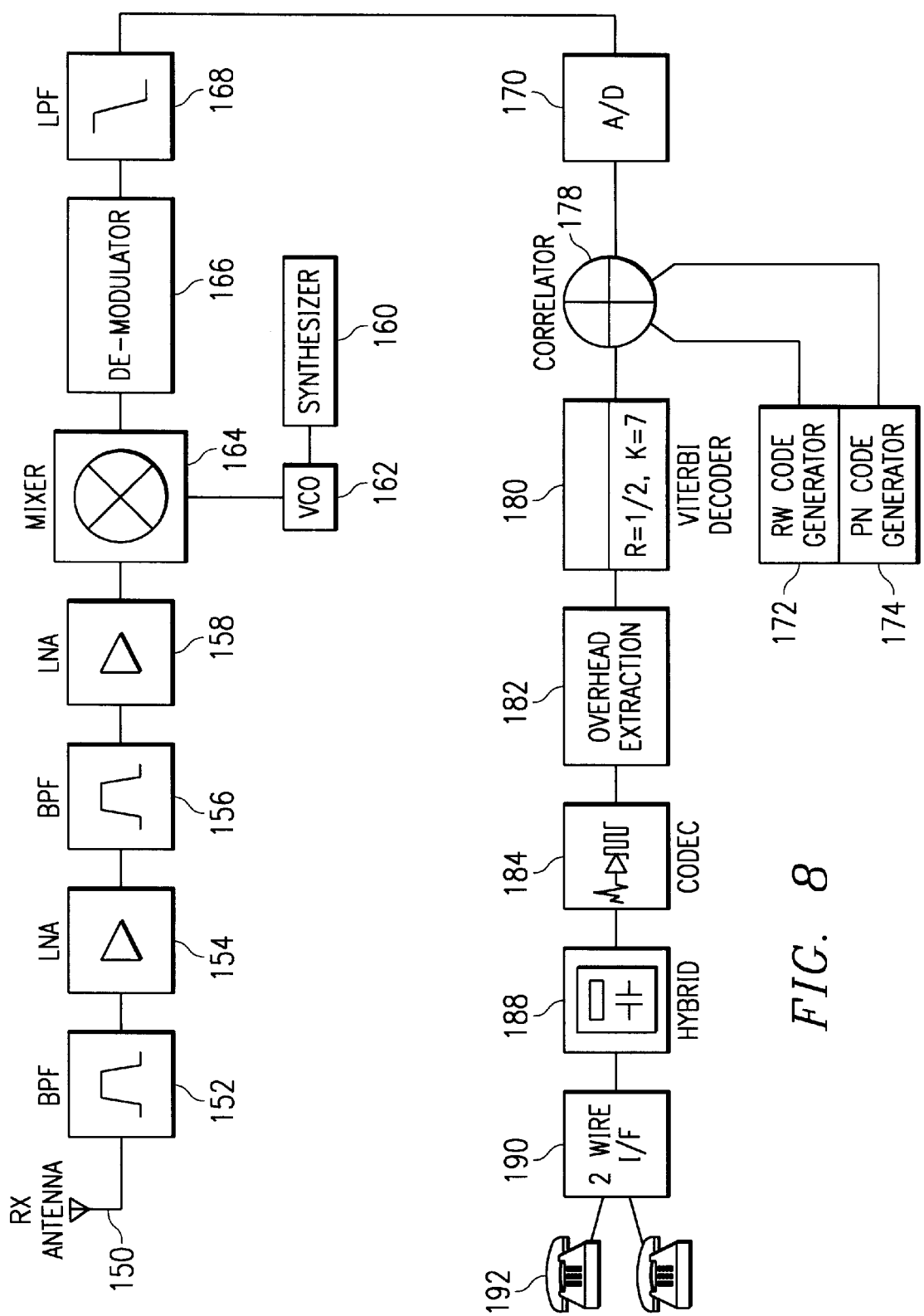
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

At the subscriber terminal 20, a stage of automatic gain control is incorporated at the IF stage. The control signal is derived from the digital portion of the CDMA receiver using the output of a signal quality estimator.

Figure 9:
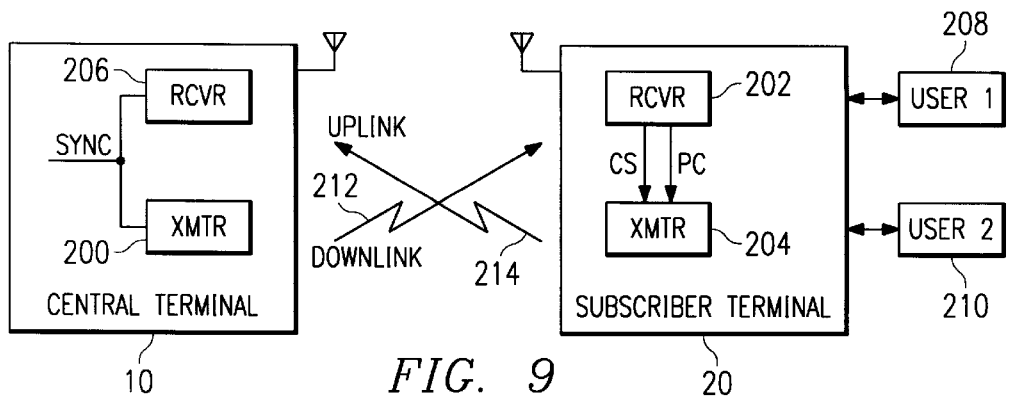
FIG. 9 is a schematic diagram illustrating downlink and uplink communication paths for the wireless telecommunications system.

FIG. 9 is a block diagram of downlink and uplink communication paths between the central terminal 10 and the subscriber terminal 20. A downlink communication path is established from the transmitter 200 in the central terminal 10 to the receiver 202 in the subscriber terminal 20. An uplink communication path is established from the transmitter 204 in the subscriber terminal 20 to the receiver 206 in the central terminal 10. Once the downlink and the uplink communication paths have been established in the wireless telecommunication system 1, telephone communication may occur between a first user 208 or a second user 210 of the subscriber terminal 20 and a user serviced through the central terminal 10 over a downlink signal 212 and an uplink signal 214. The downlink signal 212 is transmitted by the transmitter 200 of the central terminal 10 and received by the receiver 202 of the subscriber terminal 20. The uplink signal 214 is transmitted by the transmitter 204 of the subscriber terminal 20 and received by the receiver 206 of the central terminal 10. The downlink signal 212 and uplink signal 214 are transmitted as CDMA spread spectrum signals.

Figure 10:
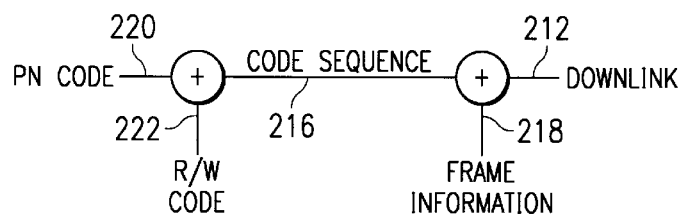
FIG. 10 is a schematic diagram illustrating a downlink signal transmitted by the central terminal.

The receiver 206 and the transmitter 200 within the central terminal 10 are synchronized to each other with respect to time and phase, and aligned as to information boundaries. In order to establish the downlink communication path, the receiver 202 in the subscriber terminal 20 should be synchronized to the transmitter 200 in the central terminal 10. Synchronization occurs by performing an acquisition mode function and a tracking mode function on the downlink signal 212. Initially, the transmitter 200 of the central terminal 10 transmits the downlink signal 212. FIG. 10 shows the contents of the downlink signal 212. The downlink signal 212 includes a code sequence signal 216 for the central terminal 10 combined with a frame information signal 218. The code sequence signal 216 is derived from a combination of a pseudo-random noise code signal 220 and a Rademacher-Walsh code signal 222. Although FIG. 10 relates specifically to the makeup of the downlink signal, the uplink has the same makeup.

Each receiver 202 of every subscriber terminal 20 serviced by a single central terminal 10 operate off of the same pseudo-random noise code signal as the central terminal 10. Each modem shelf 46 in the central terminal 10 supports one radio frequency channel and fifteen subscriber terminals 20, each subscriber terminal having a first user 208 and a second user 210. Each modem shelf 46 selects one of sixteen Rademacher-Walsh code signals 222, each Rademacher-Walsh code signal 222 corresponding to a unique subscriber terminal 20. Thus, a specific subscriber terminal 20 will have an identical code sequence signal 218 as the downlink signal 212 transmitted by the central terminal 10 and destined for the specific subscriber terminal 20.

The downlink signal 212 is received at the receiver 202 of the subscriber terminal 20. The receiver 202 compares its phase and code sequence to a phase and code sequence within the code sequence signal 216 of the downlink signal 212. The central terminal 10 is considered to have a master code sequence and subscriber terminal 20 is considered to have a slave code sequence. The receiver 202 incrementally adjusts the phase of its slave code sequence to recognize a match to master code sequence and place the receiver 202 of the subscriber terminal 20 in phase with the transmitter 200 of the central terminal 10. The slave code sequence of the receiver 202 is not initially synchronized to the master code sequence of the transmitter 200 and the central terminal 10 due to the path delay between the central terminal 10 and the subscriber terminal 20. This path delay is caused by the geographical separation between the subscriber terminal 20 and the central terminal 10 and other environmental and technical factors affecting wireless transmission.

When the downlink and the uplink communication paths are acquired, the wireless telecommunication system 1 enters the standby mode. In the standby mode, the transmitting power of the downlink and uplink transmitters are reduced by 12 decibels. This reduction in transmitting power minimizes the interference to other subscriber terminals while still maintaining synchronization. The transmit rate remains at the low rate level to allow exchange of control information between the central terminal 10 and the subscriber terminal 20 over the overhead channel 224.

When either an incoming or outgoing call is detected, a message is sent from the originating terminal to the destination terminal indicating that the downlink and uplink communication paths are required for the transmission of user traffic information. At this point, the wireless telecommunication system 1 enters into the traffic mode. During the traffic mode, the transmitting power of both the downlink and uplink communication paths is increased to the high power level and the transmit rate is increased to the high rate level of 160 kilobits per second to facilitate information transfer between originating and destination terminals. Upon detection of call termination, a message is sent from the terminating terminal to the other terminal indicating that the downlink and uplink communication paths are no longer required. At this point, wireless telecommunication system 1 reenters the standby mode. Code synchronisation and frame alignment tracking is performed in both the standby mode and the traffic mode.

Figure 11:
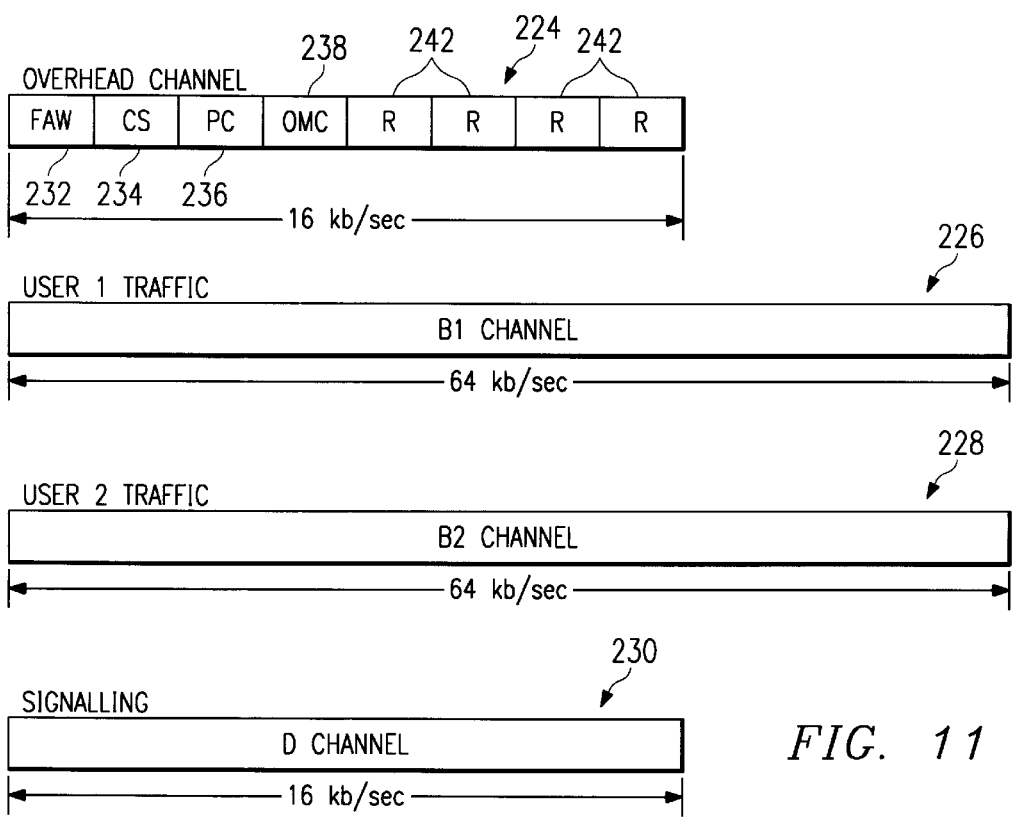
FIG. 11 is a graphical diagram illustrating the contents of a frame information signal within the downlink signal.

FIG. 11 shows the general contents of a frame information signal 218. The frame information signal 218 includes an overhead channel 224, a first user channel 226, a second user channel 228, and a signalling channel 230 for each frame of information transported over downlink signal 212. The overhead channel 224 carries control information used to establish and maintain the downlink and uplink communication paths. The first user channel 226 is used to transfer traffic information to the first user 208. The second user channel 228 is used to transfer traffic information to the second user 210. The signalling channel 230 provides the signalling information to supervise operation of the subscriber terminal telephony functions. The overhead channel 224 occupies 16 kilobits per second of a frame of information, the first user channel 226 occupies 64 kilobits per second of a frame of information, the second user channel 228 occupies 64 kilobits per second of a frame of information, and the signalling channel 230 occupies 16 kilobits per second of a frame of information.

Figure 12:
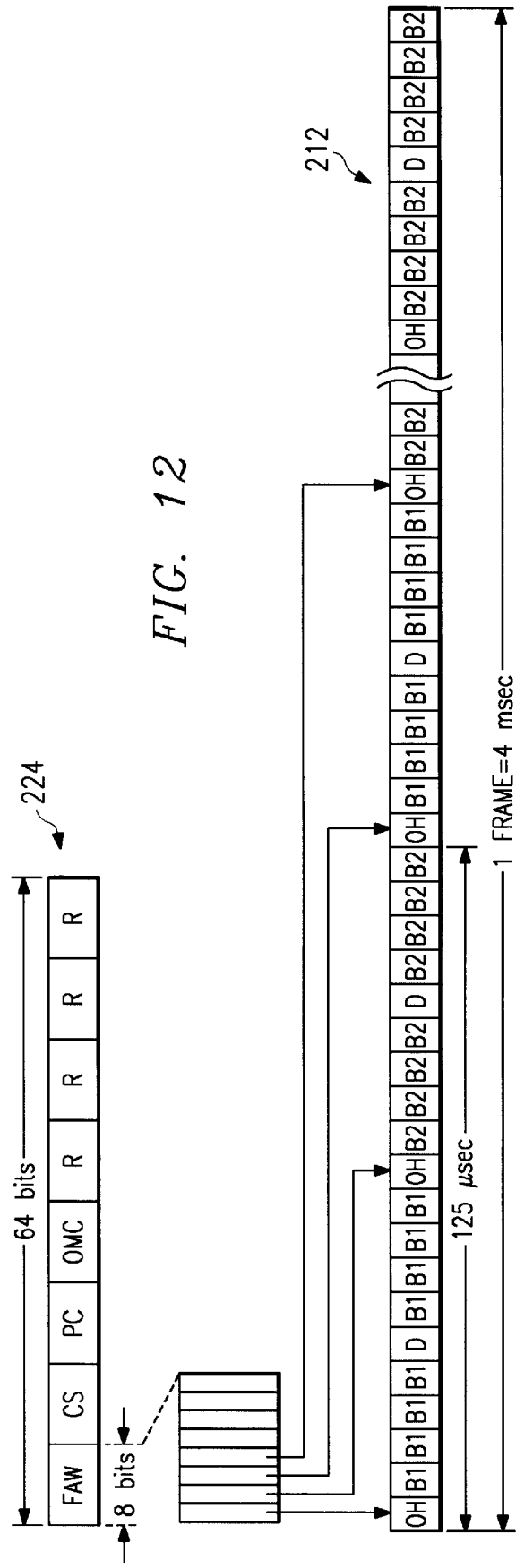
FIG. 12 is a tabular depiction illustrating overhead insertion into a data stream of the downlink signal.

FIG. 12 shows how the overhead channel 224 is inserted into the data stream of the downlink signal 212. The data stream of the downlink signal 212 is partitioned into twenty bit subframes. Each twenty bit subframe has two ten bit sections. A first ten bit section includes an overhead bit, a signalling bit, and eight first user bits. A second ten bit section includes an overhead bit, a signalling bit, and eight second user bits. This twenty bit subframe format is repeated throughout an entire four millisecond frame of information. Thus, an overhead bit occupies every tenth bit position of frame information in the data stream of the downlink signal 212.

The overhead channel 224 includes eight byte fields—a frame alignment word 232, a code synchronization signal 234, a power control signal 236, an operations and maintenance channel signal 238, and four reserved byte fields 242. The frame alignment word 232 identifies the beginning of frame position for its corresponding frame of information. The code synchronization signal 234 provides information to control synchronization of the transmitter 204 in the subscriber terminal 20 to the receiver 206 in the central terminal 10. The power control signal 236 provides information to control transmitting power of the transmitter 204 in subscriber terminal 20. The operations and maintenance channel signal 238 provides status information with respect to the downlink and uplink communication paths and a path from the central terminal to the subscriber terminal on which the communication protocol which operates on the modem shelf between the shelf controller and the modem cards also extends.

Figure 13:
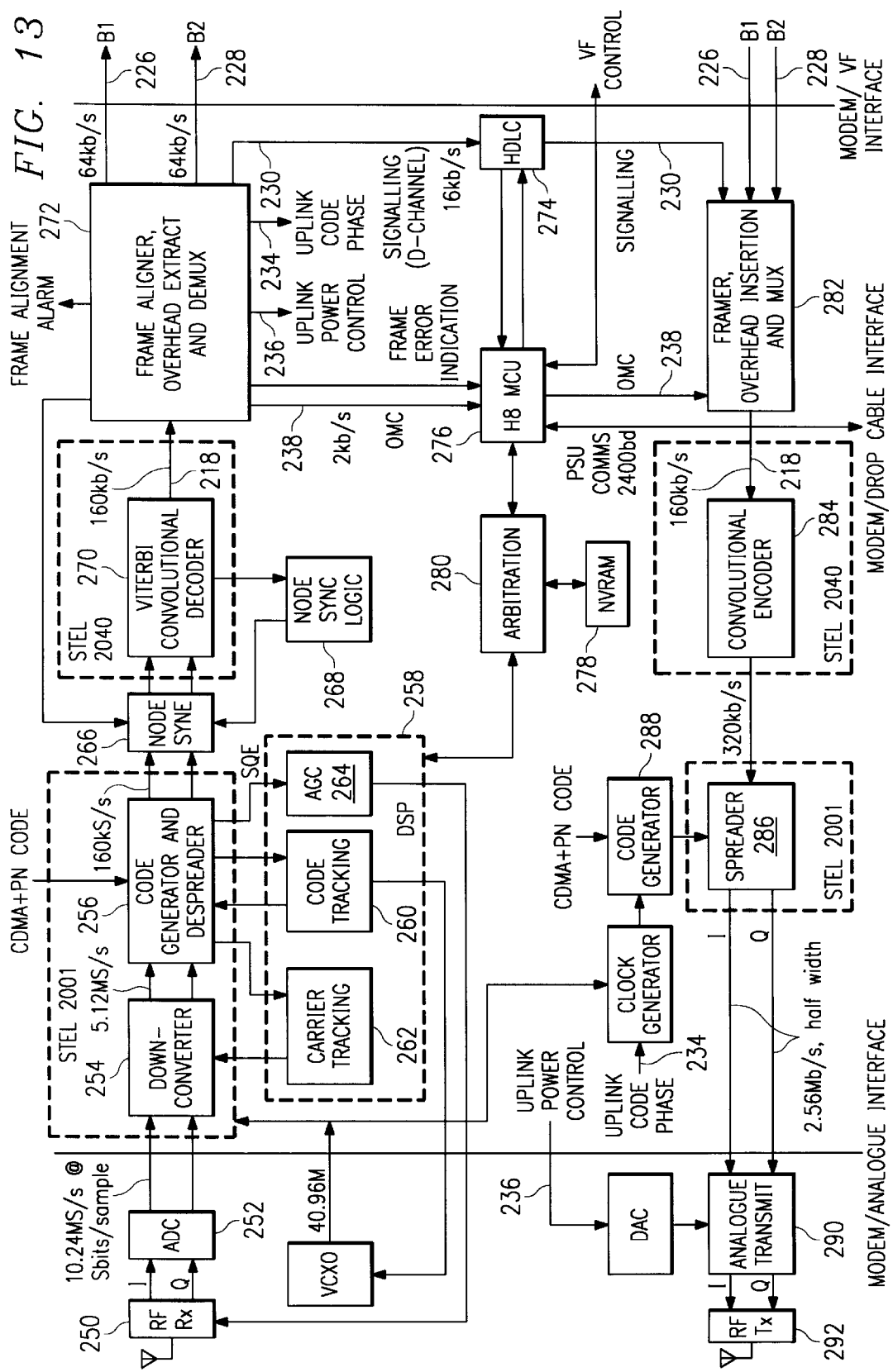
FIG. 13 is a functional block diagram of a communication controller of a subscriber terminal.

FIG. 13 is a detailed block diagram of a communications protocol converter including the receiver 202 and transmitter 204 in a subscriber terminal 20. The receiver 202 receives the downlink signal 212 at an RF receive interface 250. The RF receive interface 250 separates the spread spectrum signal into I and Q signal components. The RF receive interface 250 band pass filters each of the I and Q signal components by removing portions above approximately half of the receiver 202 bandwidth of 3.5 MegaHertz. The RF receive interface 250 low pass filters the I and Q signal components to reject image frequencies and prevent signal aliasing. The I and Q signal components are placed into digital format by an analog to digital converter 252. The sampling frequency of the analog to digital converter 252 is four times the chip period, or 10.24 MegaHertz, with an eight bit resolution.

Within the communications controller, the digital I and Q signal components are stepped to a rate of 5.12 MegaHertz by a down converter 254. A code generator and despreader 256 performs synchronization acquisition and tracking functions to synchronize the phase of the Rademacher-Walsh and pseudo-random noise code sequence of the receiver 202 to that of the downlink signal 212. A digital signal processor 258 controls the phase of the slave code sequence through a code tracker 260 and a carrier tracker 262. An automatic gain control unit 264 produces an automatic gain control signal to control the gain of RF receive interface 250. The code generator and despreader 256 generates the I and Q 160 kilobits per second of frame information for further synchronization by a node sync interface 266 under the control of a node sync logic unit 268. The node sync interface 266, through the node sync logic unit 268, determines whether the I and Q channels should be swapped, as they may be received in four different ways.

The Viterbi decoder 270 provides forward error correction on the I and Q channels and generates an error corrected 160 kilobits per second data signal after a 71 symbol delay. The error corrected signal is processed by a frame aligner and the extractor 272 determines frame alignment and extracts a power control signal 236, code synchronization 234, and an operations and maintenance channel signal 238. The frame aligner and extractor 272 also extracts a first user channel 226 and a second user channel 228 for traffic transmission towards a first user 208 and a second user 210, and a signalling channel 230 for processing by high level data link controller 274 and a microcontroller 276. The frame aligner and extractor 272 also provides alarm and error indications upon detecting a loss in frame alignment. A non-volatile random access memory 278 stores system parameter information for subsequent insertion through an arbitrator 280 in the event of link loss in order to facilitate link reestablishment. The arbitrator 280 also provides an interface between the digital signal processor 258 and the microcontroller 276.

In the transmit direction, a frame inserter 282 receives first user traffic and second user traffic from the first user 208 and the second user 210, signalling channel 230 information from the high level data link controller 274, and operations and maintenance channel 238 information from the microcontroller 276. Frame inserter 282 generates the frame information signal 218 for uplink signal 214 for processing by a convolutional encoder 284. The convolutional encoder 284 doubles the data rate of the frame information signal 218 to provide forward error correction. A spreader 286 splits the 320 kilobits per second signal of the convolutional encoder 284 into two 160 kilobits per second I and Q signals and exclusively ORs these signals with the spreading sequence generated by a code generator 288 in response to a system clock generated by the clock generator 290 as adjusted by the code synchronization signal 234. The code generator 288 generates one of sixteen Rademacher-Walsh functions exclusive ORed with a pseudo-random sequence having a pattern length of 256 with a chip rate of 2.56 MegaHertz. The pseudo-random sequence should match that of central terminal 10, but is adjustable under software control to provide reliable rejection of signals from other bands or other cells.

The spreader 286 of the communications controller supplies the I and Q signals to an analog transmitter 290. The analog transmitter 290 produces pulsed I and Q signals for an RF transmit interface 292. Transmit power is generated by first establishing a control voltage from a digital to analog converter in response to the power control signal 236 extracted from the overhead channel 224. This control voltage is applied to the power control inputs of analog transmitter 290 and RF transmit interface 292. Power control of 35 decibels is obtainable in both the analog transmitter 290 and the RF transmit interface 292. The RF transmit interface 292 includes a step attenuator that provides 2 decibel steps of attenuation over a 30 decibel range. This attenuator is used to switch between high and low power levels. On power up, maximum attenuation is selected to minimize the transmitting power of transmitter 204.

The telecommunications system described above can be modified for the transmission of a multiplexed multi-channel data and/or telephone channels in accordance with, for example, a 30-channel E1 protocol. In this case, rather than being connected to telephone lines as described above, a subscriber terminal will provide a line connection for carrying the E1 protocol (e.g., a 2 Mb/sec E1 protocol) with, for example, only 2 channels active. This modification is achieved by replacing the control circuitry for the two telephone lines in the communications controller at the subscriber terminal with an E1 channel switch (and an E1 protocol monitor where the E1 protocol includes telephone line signalling information) for connection to an E1 line. Similar E1 interface circuitry is provided at the central terminal.

FIGS. 14A–D are used for explaining the format of an E1 CAS multiframe. The CAS multiframe supports 30 data channels numbered 1–30 by means of a time-division multiplex technique employing successive frames of 32 bytes where each channel is supported by a respective timeslot in each successive frame. In other words, each frame supplies one byte for each channel. As represented in FIG. 14A, timeslot 0 represents a multiframe format timeslot, timeslots 1–15 carry bytes for channels 1–15, respectively, timeslot 16 carries signalling information and timeslot 17–31 carry bytes for channels 16–30, respectively.

FIG. 14B is identical to FIG. 14A and is intended to represent a subsequent frame, wherein the same timeslot allocation is applied. By sending one byte per frame, for each channel in the respective timeslot, the full channel information can be sent. However, in order to accommodate the signalling information for each of the channels 1–30 (in timeslots 1–15 and 17–31, respectively), signalling information for a pair of channels only is sent in one timeframe. Accordingly, in order to send the signalling information for all 30 channels plus the multiframe format channel, the signalling information is distributed among 16 successive frames. Thus, as represented in FIGS. 14C, in frame 0, the signalling information for the multiframe format timeslot 0 is sent. In frame 1, the signalling information for channels 1 and 16 is sent. In frame 2, the signalling information for channels 2 and 17 is sent, and so on. Further details of the multiframe signalling format can be found in CCITT Standard G.704. FIG. 14D illustrates the association between channels and timeslots.

Figure 15:
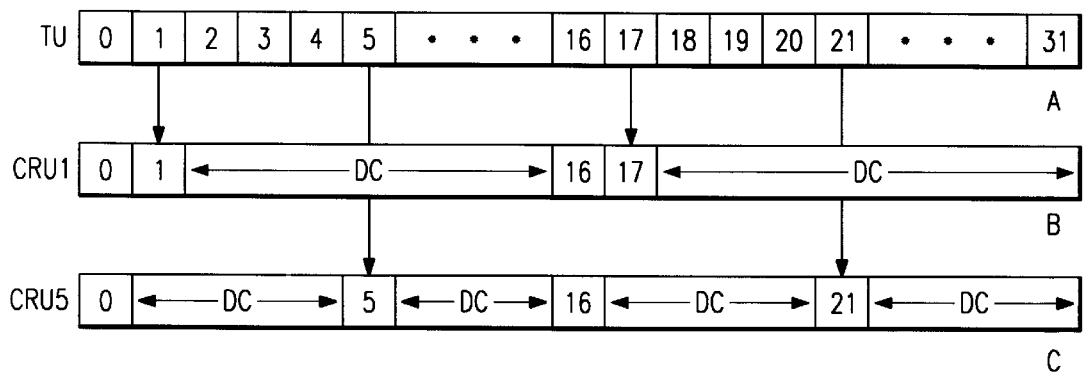
FIG. 15 is a schematic block diagram of a frame of data in accordance with the El protocol of FIG. 14 at a subscriber terminal.

FIG. 15 illustrates the use of a multiframe technique with a subscriber terminal in accordance with the invention. As explained above with reference to FIG. 11, two 64 kbit/sec channels are supported. In addition, a 16 kbit/sec signalling channel and a 16 kbit/sec overhead channel are supported.

Each timeslot in a frame illustrated in FIGS. 14A and 15A provides 64 kbit/sec of data. Accordingly, the data link between the central terminal and a subscriber terminal can support the data for two channels, that is the data for two timeslots of the frame shown in FIG. 15A.

Accordingly, FIG. 15B represents the frame format supported at a first customer radio unit (CRU 1). In this frame, timeslots 1 and 17 are occupied by the data for those channels, and the channel associated signalling (CAS) information is supplied in timeslot 16. However, the other timeslots are not occupied. Accordingly, subscriber terminal 1 in this example is supporting channels 1 and 16 (timeslots 1 and 17).

Similarly, in FIG. 15C, there is a representation of the frame supported at a second customer radio unit (CRU 5) where timeslots 5 and 21 are occupied with channel data and timeslot 16 is occupied by the channel associated signalling (CAS) data, but the remaining timeslots are unoccupied.

It will be appreciated from the above description that a number larger than two channels can be supported by providing a plurality of customer radio units at one location.

Further reference will be made to FIG. 15 in the following description.

Figure 16:
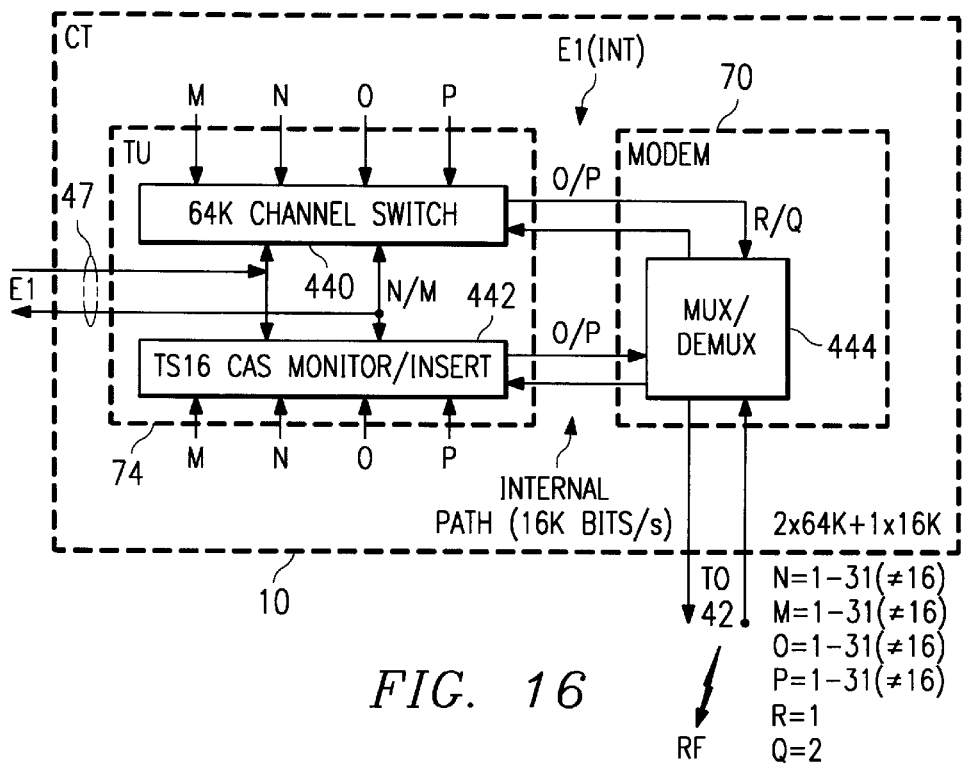
FIG. 16 is a schematic representation of the protocol conversion at the central terminal.

FIG. 16 is a schematic diagram illustrating elements of an example of an E1 interface for the allocation of timeslots at the central terminal 10. FIG. 16 represents the two way transmission of data with the tributary unit (TU) 74 receiving and transmitting, as appropriate, a multiframe E1 format from and to the PSTN 18 via the link 47. FIG. 16 represents the receipt and transmission of two timeslots (2 of 30), where N and M may be freely chosen from the available timeslots. In other words, N and M can each be selected from 1–31 timeslots with the exception of timeslot 16 which is allocated to the signalling information as indicated above. The tributary unit 74 transmits to the modem and receives from the modem 70 an internal multiframe format E1 (INT) with the timeslots M and N of the external E1 multiframe being reallocated to timeslots O and P of the internal E1 format. In the same way as the timeslots N and M can be freely chosen, the timeslots O and P can be freely chosen from timeslots 1–31 (≠16). The modem transmits and receives over the radio link using a fixed timeslot allocation (for example, R=1 and Q=2). The tributary unit TU receives selections N, M, O and P from the site management computer and applies these to a 64 K channel switch 440 and timeslot 16 monitor/insert logic 442 to switch the E1 channels and the associated signalling information from timeslot 16. It is thus possible for the allocation of the channels to be changed dynamically to take account, for example, of signal losses due to equipment failure or malfunction. The multiplexer/demultiplexer 444 in the modem 70 provides the demultiplexing of the multiplexed internal E1 channels into separate channels for transmission via the radio link and the multiplexing of the separate channels from the radio link to the multiplexed internal E1 channels. This structure thereby provides a very flexible architecture for the allocation of the timeslots which would not be possible with a fixed allocation.

Figure 17:
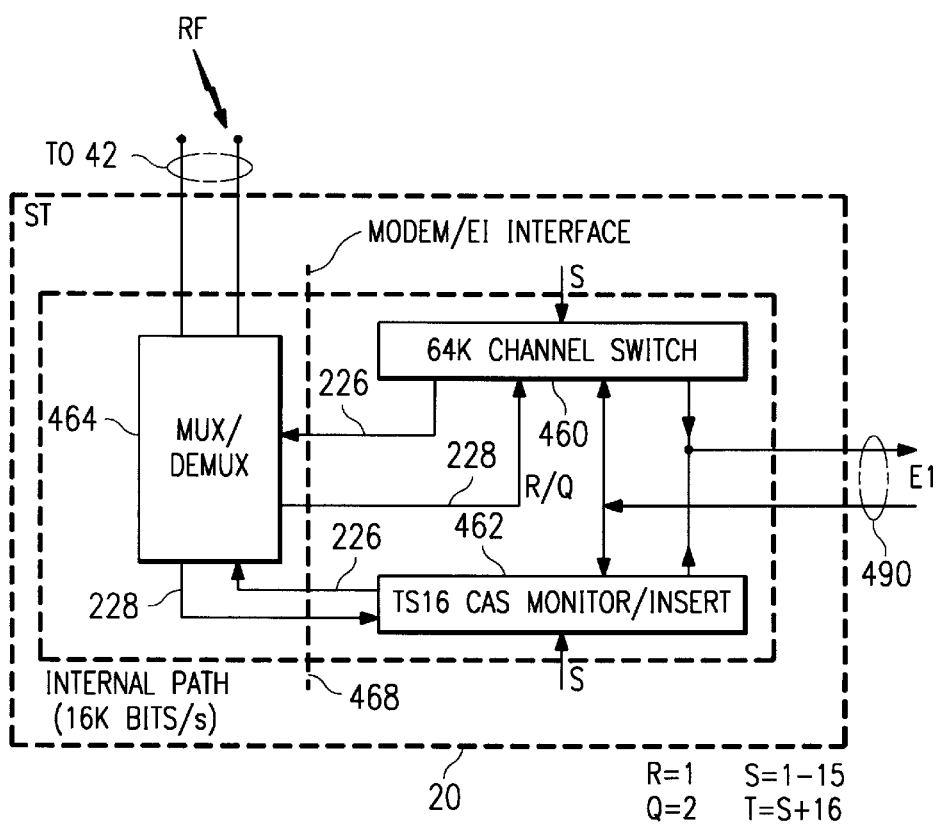
FIG. 17 is a schematic representation of the protocol conversion at the subscriber terminal.

FIG. 17 illustrates elements of an example of an E1 interface for the connection of an E1 line 490 (which typically includes a twisted pair for each of receive and transmission) at the subscriber terminal (ST) 20, where the customer radio unit (CRU) receives and transmits on the radio link using the same channels R and Q as the customer terminal.

In FIG. 17, the multiplexer/demultiplexer 464 corresponds to the multiplexer and demultiplexer 282 and 272 of FIG. 13, with the R and Q lines 226 and 228 corresponding to the B1 and B2 lines in FIG. 13. Where the subscriber terminal is configured to support the E1 protocol, the microcontroller 276 provides E1 control, (rather than the VF control of FIG. 13). Similarly, the vertical line labelled MODEM/VF INTERFACE at the right of FIG. 13 would, in this example be the modem/E1 interface. This modem/E1 interface is also illustrated by the dashed line 468 in FIG. 17. To the right of the dashed line 468, the E1 interface includes a 64 K channel switch 460 and timeslot 16 monitor/insert logic 462 to switch the E1 channels and the associated signalling information from timeslot 16 in response to a variable S, which forms part of the E1 control data.

By means of the 64 K channel switch 460 and the timeslot 16 monitor/insert logic 462, the CRU transmits and receives on timeslots which can be selected by means of the variable S. The variable S is supplied over the overhead channel from the central terminal CT, is extracted during the processing the signals received from the central terminal and is supplied by the microcontroller 276 as part of the E1 control data. In this example, the subscriber terminal at the customer equipment end uses timeslots designated by the variable S, where S=1–15 and timeslot T where T=S+16. In an alternative embodiment, however, values for S and T could be separately provided with S=1–31 (≠16) and T=1–31 (≠16).

It will be noted that the site management computer is continually monitoring the status of the radio link using control information supplied via the wireless control channel and/or the wireless signalling channel and by means of the timeslot allocation procedures as indicated above, is able readily to accommodate changes in the system due to equipment failure, the provision of additional equipment, or any other variable situation which makes a changes in the timeslot allocation desirable.

It should be noted that the N, M, O and P timeslots allocated to a specific R and Q are different for each of the subscriber terminals ST communicating with the central terminal CT. Thus, there are 15 modems, for up to 15 subscriber terminals.

Figure 18:
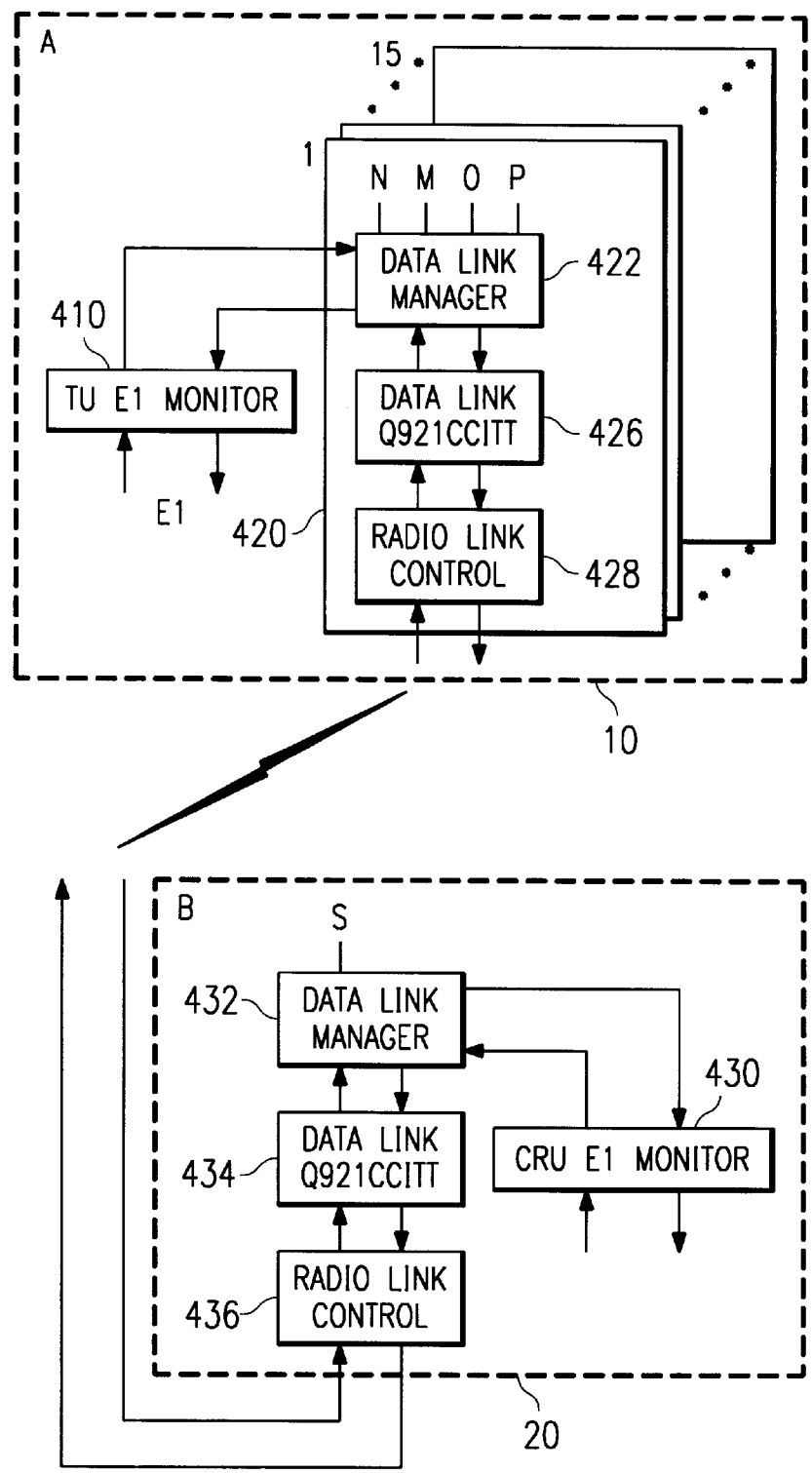
FIG. 18 is a schematic representation of the protocol conversion operations performed.

FIG. 18 represents the management protocol structure used in the central terminal and subscriber terminal to implement the monitoring and inserting of CAS signalling information in timeslot 16 of the E1 protocol.

In the central terminal (CT) a TU E1 monitor 410 monitors the received E1 protocol and supplies received timeslot 16 CAS information to a data link manager 422 which manages the timeslot allocation in accordance with the variables N, M, O and P supplied from the site management computer. The timeslot 16 CAS information is supplied from the data link manager to a data link based on the Q921 CCITT Standard for maintaining the integrity of the radio communications. The data link 426 is connected to a radio link controller 428 for the control of the radio link itself. Incoming data passes via the TU E1 monitor 410 to the data link manager 422, the data link 426 and the radio link control 428 and also in the other direction for data received from the radio link. The fifteen sets of the data link manager, 422, data link 426 and radio link control 428 are provided as represented within the box 420.

In FIG. 18B, the parallel structure of a CRU E1 monitor 430, data link manager 432, data link based on G921 CCITT 434 and radio link control 436 is represented. The data link manager receives the variables via the overhead channel from the site management computer in order to provide the appropriate selection of the S and T timeslots at the subscriber terminal 20.

Returning to FIG. 15, the frame format shown in FIG. 15B could be an example where N=1, M=17, 0=1, P=17, S=1 and T=17. Similarly, the frame shown in FIG. 15C could be an example where N=5, M=21, 0=5, P=21, S=5 and T=21.

Figure 19:
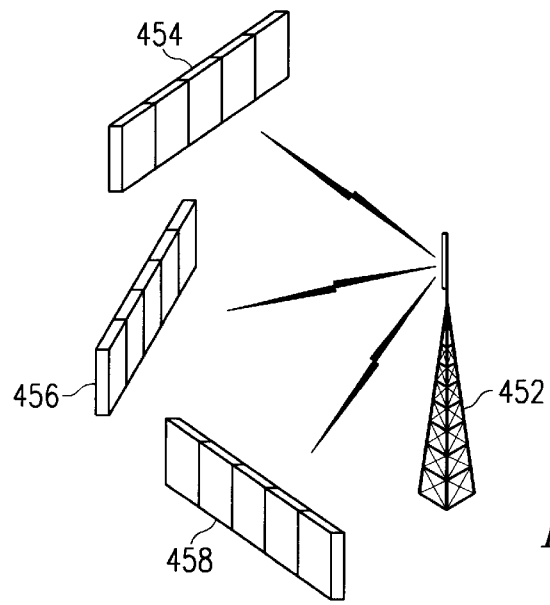
FIG. 19 is a schematic representation of an example of a system including a plurality of subscriber terminals grouped for the transmission of an El protocol.

FIG. 19 illustrates the provision of three groups 454, 456 and 458 of five subscriber terminals each for communication with a central terminal 452. This arrangement enables the communication of up to ten channels (timeslots) per location. In practice, it would be normal to supply up to nine channels per location, with one being provided as a reserve in the case of radio link failure. It will be appreciated that other groupings of subscriber terminal may be provided in accordance with the data transmission needs of the telecommunications network.

In the above description of FIGS. 14 to 19, it has been assumed that multiple channels are to be transmitted where each channel has associated with it telephone signalling information (e.g., in timeslot 16). However, the same basic structure as described with reference to FIGS. 14 to 19 can be used for the transmission of multiple-channel pure digital data without signalling information (i.e., not telephone call state data). Multi-channel digital data transmission can be performed in accordance with the E1 standard by setting the timeslot 16 to an idle (don't care) state. In this state the telecommunications system can be used for the transmission of pure multi-channel data.

Figure 14:
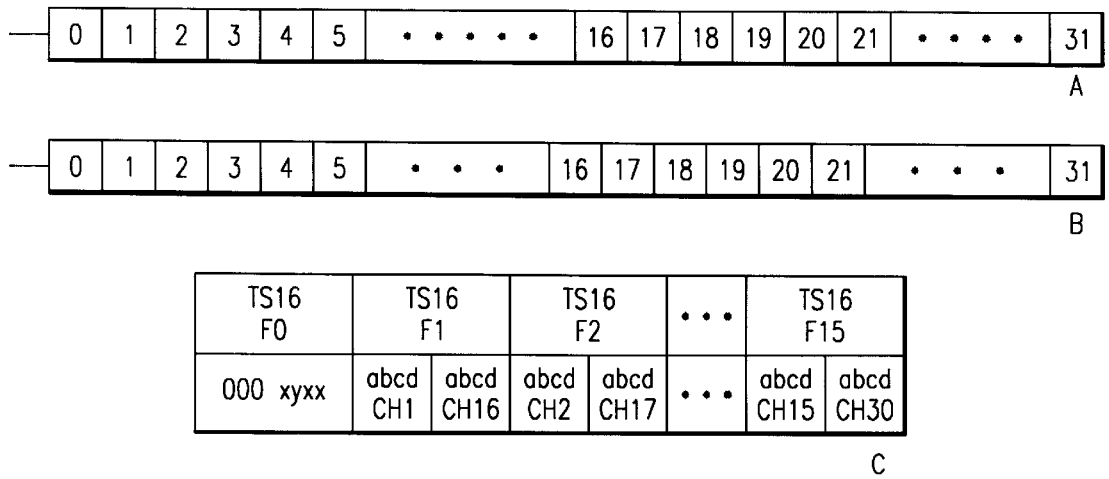
FIGS. 14A–D form a schematic representation of a frame of data in accordance with the 30 channel E1 protocol and illustrate the association between timeslots and channels.

In other words, with reference to FIG. 14, timeslot 16 for successive frames of data as illustrated in FIG. 14 at A and B is in a don't care state. Accordingly, FIG. 14C does not apply to the transmission of multi-channel digital data without signalling information. Likewise, in FIG. 14D, no signalling (CAS) information is sent in timeslot 16.

With reference to FIGS. 15A–15C, in the case of multi-channel digital data transmission, time slot 16 does not contain any useful information (i.e., timeslot 16 is in a don't care state where the data can be zeros or ones as the information in this timeslot is not used).

Figure 20:
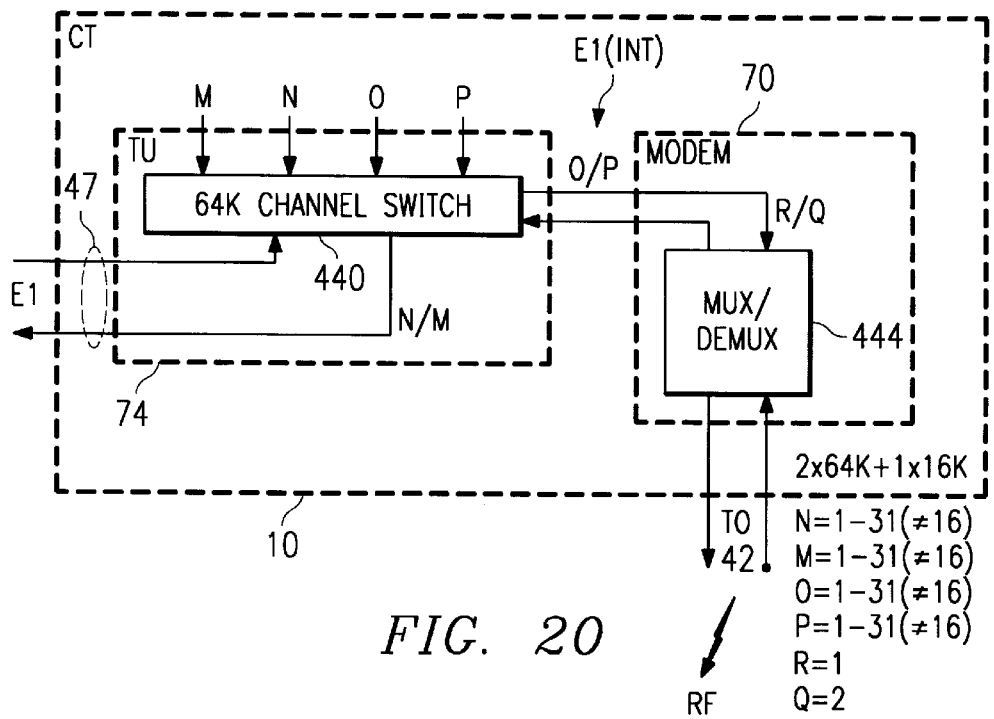
FIG. 20 is a schematic representation of an alternative to the protocol conversion at the central terminal of FIG. 16 for use with multi-channel digital data transmission.
Figure 21:
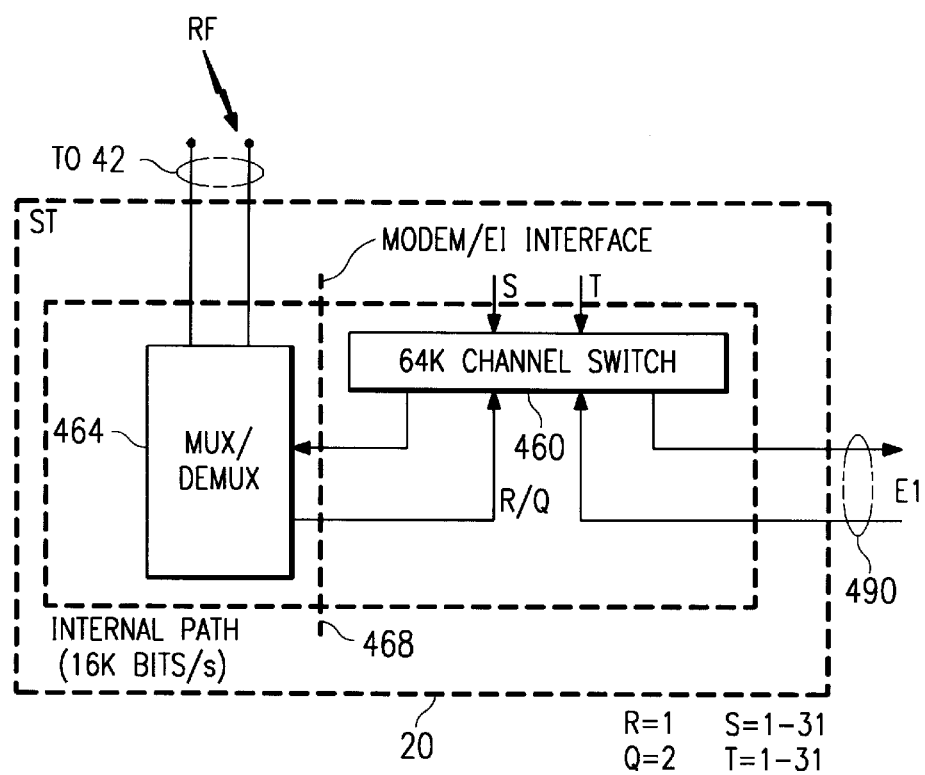
FIG. 21 is a schematic representation of an alternative to the protocol conversion at the subscriber terminal of FIG. 16 for use with multi-channel digital data transmission.

FIGS. 20 and 21 correspond, respectively, to FIGS. 16 and 17, except that the timeslot 16 monitor/insertion logic 442/462 is omitted and in this case the values for each of S and T are set separately. It will be appreciated that the same structure as shown in FIGS. 16 and 17 could be used for multi-channel digital data transmission without signalling information if the timeslot 16 monitor/insertion logic is disabled.

In the same manner, the management protocol structure illustrated in FIG. 18 is not used for multi-channel digital data transmission without signalling information.

Accordingly, there has been described a telecommunications system providing radio communication of a multiline protocol which is very flexible in operation and enables the implementation of high capacity data channels (for example, a so-called "kilostream" link).

There has also been described a telecommunications system providing radio communication of a multiplexed multichannel digital data protocol which is very flexible in operation and enables the implementation of high capacity data channels without signalling. Although this can be used in the context of a telephone system, it could also be used in the context more generally of a telecommunications system for transmission of information. The multi-channel digital data transmission system operates as a multi-channel data pipe into which multiple channels of multiplexed channels of digital data can be inserted and from which, at the other end of the radio link, multiplexed channels of digital data can be extracted.

Although particular embodiments have been described herein, it will be appreciated that the invention is not limited thereto and that many modifications and additions thereto may be made within the scope of the invention.

For example, in the embodiments described above, the communications protocol converter at the central station comprises a modem card and a tributary unit, and the communications protocol converter at the subscriber station comprises a modem card. However, it will be appreciated that other architectures and constructions may be employed within the scope of the invention. For example ASIC circuits or other hardware component(s) may be employed, for example, to implement at least some of the features of a communications protocol converter, central or subscriber station or telecommunications system described herein.

What is claimed is:

1. A communications protocol converter for a central station of a wireless telecommunications system in which said central station communicates with a plurality of subscriber stations served by said central station, said central station is connectable to a telecommunications network under a multiplexed multi-channel digital data telecommunications protocol having a plural number of digital data user channels, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, where said plural number is greater than said predetermined plurality, and said central station is connectable to each subscriber station via a wireless link under a wireless link protocol having said predetermined plurality of digital data user channels, wherein said communications protocol converter comprises a central protocol interface for converting between said multiplexed multi-channel digital data telecommunications protocol and said wireless link protocol for each wireless link.

2. A communications protocol converter according to claim 1, wherein each channel of said multi-channel digital data protocol is allocated a respective timeslot.

3. A communications protocol converter according to claim 2, wherein the allocation of an externally received channel timeslot to a wireless transmission timeslot is variable.

4. A communications protocol converter according to claim 3, wherein said timeslot allocation is controlled by said central station.

5. A communications protocol converter according to claim 4, wherein said central station controls said timeslot allocation at a subscriber station by passing control data via an additional wireless control channel.

6. A communications protocol converter according to claim 1, wherein said communications protocol converter, between said multiplexed multi-channel digital data protocol and said wireless link protocol, is arranged to allocate timeslots according to an intermediate protocol.

7. A communications protocol converter according to claim 2, wherein said allocation of timeslots is dynamically variable.

8. A communications protocol converter according to claim 1, wherein said plural number equals 30.

9. A communications protocol converter according to claim 1, wherein said predetermined plurality equals 2.

10. A communications protocol converter according to claim 1, wherein each digital data user channel has a 64 kbit/sec bandwidth.

11. A communications protocol converter according to claim 1, wherein said wireless link protocol includes an overhead control channel having a 16 kbit/sec bandwidth.

12. A communications protocol converter according to claim 1, wherein said multi-channel digital data telecommunications protocol is an E1 standard protocol.

13. A communications protocol converter according to claim 1, wherein said wireless link protocol carries serial data on said digital data user channels.

14. A communications protocol converter according to claim 1, wherein said wireless link protocol comprises a signalling channel for carrying serial link management data.

15. A communications protocol converter according to claim 1, wherein said signalling channel has a 16 kbit/sec bandwidth.

16. A communications protocol converter according to claim 1, comprising a modem.

17. A central station of a wireless telecommunications system in which said central station communicates with a plurality of subscriber stations served by said central station, said central station is connectable to a telecommunications network under a multiplexed multi-channel digital data telecommunications protocol having a plural number of digital data user channels, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, where said plural number is greater than said predetermined plurality, and said central station is connectable to each subscriber station via a wireless link under a wireless link protocol having said predetermined plurality of digital data user channels, wherein said central station comprises a communications protocol converter having a central protocol interface for converting between said multiplexed multi-channel digital data telecommunications protocol and said wireless link protocol for each wireless link.

18. A communications protocol converter for a subscriber station of a wireless telecommunications system in which a central station communicates with a plurality of said subscriber stations served by said central station, said central station is connectable to a telecommunications network under a multiplexed multi-channel digital data telecommunications protocol having a plural number of digital data user channels, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, where said plural number is greater than said predetermined plurality, and said central station is connectable to each subscriber station via a wireless link under a wireless link protocol having said predetermined plurality of digital data user channels, wherein said communications protocol converter comprises a subscriber protocol interface for converting between said wireless link protocol and said multiplexed multi-channel digital data telecommunications protocol with said predetermined number of digital data channels.

19. A communications protocol converter according to claim 18, wherein each channel of said multi-channel digital data protocol is allocated a respective timeslot.

20. A communications protocol converter according to claim 19, wherein the allocation of an externally received channel timeslot to a wireless transmission timeslot is variable.

21. A communications protocol converter according to claim 20, wherein said timeslot allocation is controlled by said central station.

22. A communications protocol converter according to claim 21, wherein said central station controls said timeslot allocation at a subscriber station by passing control data via an additional wireless control channel.

23. A communications protocol converter according to claim 19, wherein said allocation of timeslots is dynamically variable.

24. A communications protocol converter according to claim 18, wherein said plural number equals 30.

25. A communications protocol converter according to claim 18, wherein said predetermined plurality equals 2.

26. A communications protocol converter according to claim 18, wherein each digital data user channel has a 64 kbit/sec bandwidth.

27. A communications protocol converter according to claim 18, wherein said wireless link protocol includes an overhead control channel having a 16 kbit/sec bandwidth.

28. A communications protocol converter according to claim 18, wherein said multi-channel digital data telecommunications protocol is an El standard protocol.

29. A communications protocol converter according to claim 18, wherein said wireless link protocol carries serial data on said digital data user channels.

30. A communications protocol converter according to claim 18, wherein said wireless link protocol comprises a signalling channel for carrying serial link management data.

31. A communications protocol converter according to claim 18, wherein said signalling channel has a 16 kbit/sec bandwidth.

32. A communications protocol converter according to claim 18, comprising a modem.

33. A subscriber station of a wireless telecommunications system in which a central station communicates with a plurality of said subscriber stations served by said central station, said central station is connectable to a telecommunications network under a multiplexed multi-channel digital data telecommunications protocol having a plural number of digital data user channels, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, where said plural number is greater than said predetermined plurality, and said central station is connectable to each subscriber station via a wireless link under a wireless link protocol having said predetermined plurality of digital data user channels, wherein said subscriber station comprises a communications protocol converter having a subscriber protocol interface for converting between said wireless link protocol and said multiplexed multi-channel digital data telecommunications protocol with said predetermined plurality of digital data user channels.

34. A wireless telecommunications system in which a central station communicates with a plurality of subscriber stations served by said central station, said central station is connectable to a telecommunications network under a multiplexed multi-channel digital data telecommunications protocol having a plural number of digital data user channels, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, where said plural number is greater than said predetermined plurality, and said central station is connectable to each subscriber station via a wireless link under a wireless link protocol having said predetermined plurality of digital data user channels, wherein said central station includes a central protocol interface for converting between said multiplexed multi-channel digital data telecommunications protocol and said wireless link protocol for each wireless link and a plurality of said subscriber stations each include a subscriber protocol interface for converting between said wireless link protocol and said multiplexed multi-channel digital data telecommunications protocol with said predetermined plurality of digital data user channels.

35. A method of transmitting information under a multiplexed multi-channel digital data telecommunications protocol having a plural number of digital data user channels via a wireless telecommunications system where a central station for receiving said multiplexed multi-channel digital data telecommunications protocol provides wireless communication with a plurality of subscriber stations, each subscriber station operable to receive a predetermined plurality of digital data user channels from the central station, each digital data user channel associated with a unique one of a plurality of subscribers, each subscriber station having a wireline connection for carrying each of the predetermined plurality of digital data user channels to and from its associated one of the plurality of subscribers, said plural number being greater than said predetermined plurality, via wireless links under a wireless link protocol having said predetermined plurality of digital data user channels, wherein said method comprises, at said central station converting between said multiplexed multi-channel digital data telecommunications protocol and said wireless link protocol for each wireless link, and at each subscriber station converting between said wireless link protocol and said multiplexed multi-channel digital data telecommunications protocol with said predetermined plurality of digital data user channels.

36. A method according to claim 35, wherein each channel of said multi-channel digital data protocol is allocated a respective timeslot.

37. A method according to claim 36, comprising allocating an externally received channel timeslot to a wireless transmission timeslot in a variable manner.

38. A method according to claim 37, comprising controlling said timeslot allocation by said central station.

39. A method according to claim 38, comprising said central station controlling said timeslot allocation at a subscriber station by passing control data via an additional wireless control channel.

40. A method according to claim 35, wherein, at said central station, between said multiplexed multi-channel digital data protocol and said wireless link protocol, timeslots are allocated according to an intermediate protocol.

41. A method according to claim 35, wherein said allocation of timeslots is dynamically variable.

42. A method according to claim 35, wherein said plural number equals 30.

43. A method according to claim 35, wherein said predetermined plurality equals 2.

44. A method according to claim 35, wherein each digital data user channel has a 64 kbit/sec bandwidth.

45. A method according to claim 35, wherein said wireless link protocol includes a control channel having a 16 kbit/sec bandwidth.

46. A method according to claim 35, wherein said multiplexed multi-channel digital data telecommunications protocol is an El standard protocol.

47. A method according to claim 35, wherein said wireless link protocol carries serial data on said digital data user channels.

48. A method according to claim 35, wherein said wireless link protocol comprises a signalling channel for carrying serial link management data.

49. A method according to claim 48, wherein said signalling channel has a 16 kbit/sec bandwidth.

* * * * *